United States Patent
Sun et al.

(10) Patent No.: US 11,430,200 B2
(45) Date of Patent: Aug. 30, 2022

(54) EFFICIENT K-NEAREST NEIGHBOR SEARCH ALGORITHM FOR THREE-DIMENSIONAL (3D) LIDAR POINT CLOUD IN UNMANNED DRIVING

(71) Applicant: SHANGHAITECH UNIVERSITY, Shanghai (CN)

(72) Inventors: Hao Sun, Shanghai (CN); Yajun Ha, Shanghai (CN)

(73) Assignee: SHANGHAITECH UNIVERSITY, Shanghai (CN)

( * ) Notice: Subject to any disclaimer, the term of this patent is extended or adjusted under 35 U.S.C. 154(b) by 0 days.

(21) Appl. No.: 17/593,852

(22) PCT Filed: Jun. 9, 2021

(86) PCT No.: PCT/CN2021/099114
§ 371 (c)(1),
(2) Date: Sep. 27, 2021

(87) PCT Pub. No.: WO2022/017038
PCT Pub. Date: Jan. 27, 2022

(65) Prior Publication Data
US 2022/0148281 A1    May 12, 2022

(30) Foreign Application Priority Data
Jul. 22, 2020 (CN) .................. 202010710469.X

(51) Int. Cl.
*G06V 10/22* (2022.01)
*G06V 20/50* (2022.01)
*G06T 7/10* (2017.01)

(52) U.S. Cl.
CPC .............. *G06V 10/23* (2022.01); *G06T 7/10* (2017.01); *G06V 20/50* (2022.01); *G06T 2207/10028* (2013.01)

(58) Field of Classification Search
CPC .......... G06V 10/23; G06V 20/50; G06T 7/10; G06T 2207/10028
(Continued)

(56) References Cited

U.S. PATENT DOCUMENTS

2007/0250476 A1    10/2007 Krasnik
2021/0103780 A1*    4/2021 Mammou ............ G06K 9/6215

FOREIGN PATENT DOCUMENTS

| CN | 106156281 A | 11/2016 |
| CN | 110222626 A | 9/2019 |
| CN | 111860340 A | 10/2020 |

OTHER PUBLICATIONS

David Wehr, et al., Parallel kd-Tree Construction on the GPU with an Adaptive Split and Sort Strategy, International Journal of Parallel Programming, 2018, pp. 1139-1156, vol. 46.
(Continued)

*Primary Examiner* — Amandeep Saini
(74) *Attorney, Agent, or Firm* — Bayramoglu Law Offices LLC

(57) ABSTRACT

An efficient K-nearest neighbor search algorithm for three-dimensional (3D) lidar point cloud in unmanned driving and a use of the foregoing K-nearest neighbor search algorithm in a point cloud map matching process in the unmanned driving are provided. A novel data structure for fast K-nearest neighbor search is used, such that each voxel or sub-voxel includes a proper quantity of points to reduce redundant search. The novel K-nearest neighbor search algorithm is based on a double segmentation voxel structure (DSVS) and a field programmable gate array (FPGA). By means of the novel K-nearest neighbor search algorithm, nearest neighbors are searched for only in a neighboring expected area near a search point, thereby reducing search of redundant points. In addition, an optimized data transmission and
(Continued)

access policy is used, which makes the algorithm more fit the characteristic of the FPGA.

5 Claims, 1 Drawing Sheet

(58) Field of Classification Search
USPC .......................................................... 382/104
See application file for complete search history.

(56) References Cited

OTHER PUBLICATIONS

Pedro Leite, et al., Nearest Neighbor Searches on the GPU a Massively Parallel Approach for Dynamic Point Clouds, International Journal of Parallel Programming, 2012, pp. 313-330, vol. 40.
Fahad Bin Muslim, et al., Energy-efficient FPGA Implementation of the k-Nearest Neighbors Algorithm Using OpenCL, Position Papers, 2016, pp. 141-145, vol. 9.

* cited by examiner

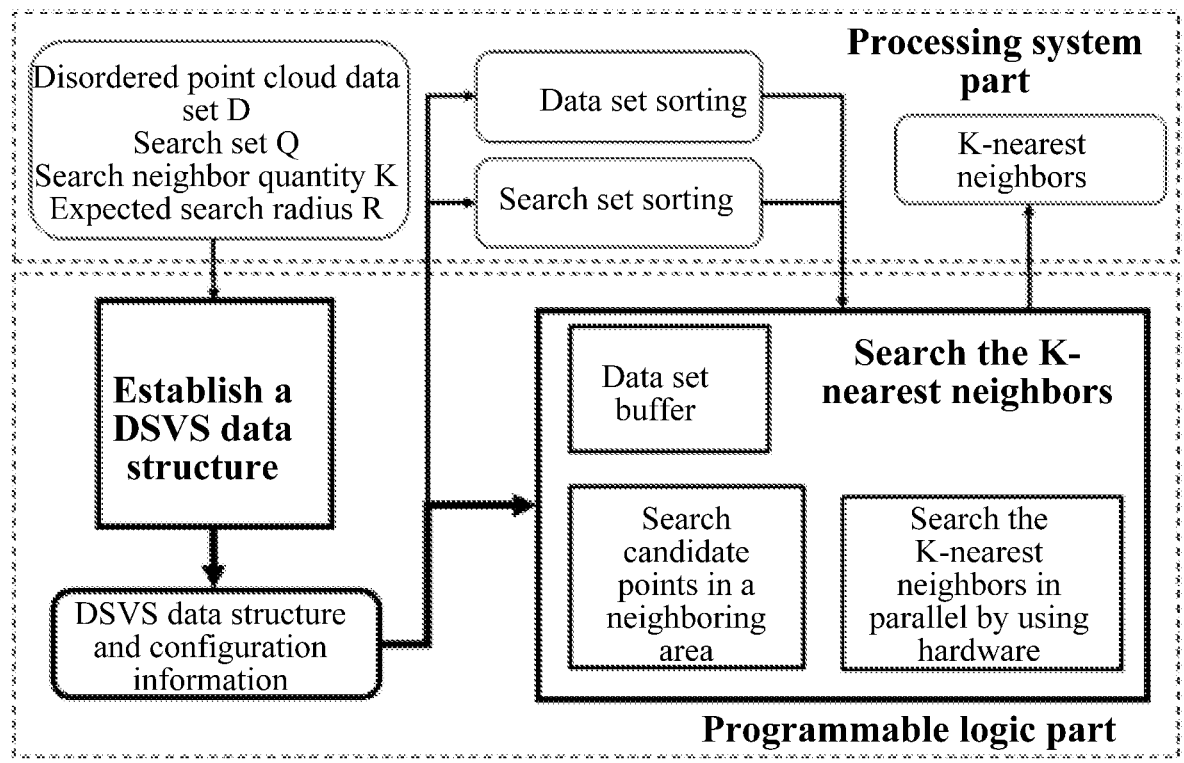

EFFICIENT K-NEAREST NEIGHBOR SEARCH ALGORITHM FOR THREE-DIMENSIONAL (3D) LIDAR POINT CLOUD IN UNMANNED DRIVING

CROSS REFERENCE TO THE RELATED APPLICATIONS

This application is the national phase entry of International Application No. PCT/CN2021/099114, filed on Jun. 9, 2021, which is based upon and claims priority to Chinese Patent Application No. 202010710469.X, filed on Jul. 22, 2020, the entire contents of which are incorporated herein by reference.

TECHNICAL FIELD

The present invention relates to a K-nearest neighbor search algorithm implemented by an efficient field programmable gate array (FPGA) of three-dimensional (3D) lidar point cloud in unmanned driving.

BACKGROUND

The K-nearest neighbor search algorithm is to search for K pieces of data nearest some given data in a given data set. The Euclidean distance, the Manhattan distance, or the like may be used to indicate a distance. The K-nearest neighbor search algorithm usually has two processes, to be specific, establishing a search data structure and searching for K-nearest neighbors. K-nearest neighbor search is widely applied to algorithms such as computer vision, artificial intelligence, and simultaneous mapping and localization. In the field of unmanned driving, massive point cloud data is unevenly distributed in wide space around a vehicle. This makes it difficult for the current most advanced K-nearest neighbor search algorithm to effectively process. In addition, a strict constraint on battery usage of an intelligent vehicle also imposes an energy consumption requirement on implementation of the K-nearest neighbor search algorithm.

To efficiently implement K-nearest neighbor search of large-scale three-dimensional (3D) point cloud, relevant experts first perform optimization at an algorithm level. A k-dimensional (KD)-Tree (Reference [1]: D. Wehr and R. Radkowski, "Parallel kd-tree construction on the gpu with an adaptive split and sort strategy," International Journal of Parallel Programming, vol. 46, pp. 1139-1156, 2018.) can implement fast search, but correspondingly it takes a relatively long time to establish a tree search structure. Contrary to the KD-tree, a grid-based data structure (GBDS) (Reference [2]: P J. S. Leite, J. M. X. N. Teixeira, T. S. M. C. de Farias, B. Reis, V. Teichrieb, and J. Kelner, "Nearest neighbor searches on the gpu," International Journal of Parallel Programming, vol. 40, pp. 313-330, 2011) can quickly establish a search structure, but is inferior to the KD-tree in terms of search, and its efficiency is limited by point cloud distribution. Another shortcoming of the GBDS is that the searching for sufficient points in a continuously expanding area causes much redundant search.

To further improve an energy efficiency ratio of the K-nearest neighbor search algorithm, some researchers consider using an FPGA (Reference [3]: F B Muslim, A. Demian, L. Ma, L. Lavagno, and A. Qamar, "Energy-efficient fpga implementation of the k-nearest neighbors algorithm using opencl." in FedCSIS Position Papers, 2016, pp. 141-145.) or a graphics processing unit (GPU) (reference [1]) to accelerate the process. However, the result shows that acceleration of the current existing algorithm still cannot meet requirements of real-timeness and low power consumption, and the energy efficiency ratio of the algorithm still needs to be further improved.

SUMMARY

An objective of the present invention is to further improve an energy efficiency ratio of a K-nearest neighbor search algorithm.

To achieve the foregoing objective, a technical solution in the present invention is to provide an efficient K-nearest neighbor search algorithm for three-dimensional (3D) lidar point cloud in unmanned driving, including the following steps:

step 1: calculating an axis-aligned bounding box (AABB) of a disordered point cloud data set;

step 2: segmenting the AABB obtained in the previous step into S 3D spaces based on an expected radius R set by a user, where each 3D space is defined as a voxel, an edge length of each voxel is $R_{re}$, and $R_{re} \geq R$;

step 3: traversing each piece of point cloud data in the disordered point cloud data set in step 1, and calculating a specific voxel to which each piece of point cloud data belongs and a quantity of pieces of point cloud data included in each voxel;

step 4: further segmenting the corresponding voxel into a plurality of sub-voxels based on the quantity of pieces of point cloud data included in each voxel; assuming that an $i^{th}$ voxel includes $N_i$ pieces of point cloud data, where i=1, 2, ..., I; segmenting the $i^{th}$ voxel into J sub-voxels if $N_i > T$, and ensuring that $\overline{N_j} < A$, where T is a preset threshold, $$\overline{N_J} = \frac{\sum_{j=1}^{J} N_j}{J},$$

$N_j$ represents a quantity of pieces of point cloud data included in a $j^{th}$ sub-voxel, and A is a parameter adjusted by the user or dynamically adjusted by a scene;

step 5: segmenting the disordered point cloud data set into a series of voxels and sub-voxels by using step 1 to step 4, where a double segmentation voxel structure (DSVS) data structure is constructed by the series of voxels and sub-voxels; and step 7: searching for a search point based on the DSVS data structure by using the K-nearest neighbor search algorithm to obtain K pieces of nearest neighboring point cloud data of the current search point within the expected radius R, where step 6 may include the following steps:

step 701: calculating a voxel to which the search point belongs, and defining the voxel as a current voxel;

step 702: calculating distances between the search point and neighboring voxels and/or sub-voxels of the current voxel, where a search domain is constructed by the neighboring voxels and/or sub-voxels within a distance range and the current voxel; and step 703: traversing pieces of point cloud data in the search domain, and calculating K pieces of nearest neighboring point cloud data of the search point in the pieces of point cloud data.

Preferably, in step 2, a memory constraint may be further considered when the 3D space is segmented, and the memory constraint is as follows: if a quantity of voxels obtained based on the expected radius R is greater than a maximum quantity M allowed by a memory, the edge length $R_{re}$ of each voxel is greater than the expected radius R when the AABB is segmented, such that the quantity of voxels obtained though segmentation is not greater than M; if the quantity of voxels obtained based on the expected radius R is not greater than the maximum quantity M allowed by the memory, the edge length $R_{re}$ of each voxel is equal to the expected radius R when the AABB is segmented.

Preferably, in step 5, the DSVS data structure may further include configuration information, and the configuration information may include a total quantity of voxels, voxels segmented into sub-voxels, a quantity of corresponding sub-voxels, pieces of point cloud data included in each voxel and sub-voxel, and the edge length $R_{re}$ of each voxel.

Preferably, after step 5 and before step 7, the algorithm may further include the following steps:

obtaining a search set constructed by search points, and sorting the disordered point cloud data set and the search set based on the DSVS data structure and the configuration information, such that physical addresses of search points located in an identical voxel or sub-voxel in the search set are neighboring and continuous, thereby continuously transmitting the search points into an FPGA, and simultaneously reading a plurality of pieces of data in an identical voxel or sub-voxel on the FPGA.

Preferably, in step 703, in a traversal search process, the K pieces of nearest neighboring point cloud data may be searched in parallel in forms of an intra-function pipeline and an inter-function data flow by using the FPGA.

Another technical solution of the present invention is to provide a use of the foregoing K-nearest neighbor search algorithm in a point cloud map matching process in unmanned driving, where if a three-dimensional (3D) point cloud map already constructed in the unmanned driving is the disordered point cloud data set in step 1, the DSVS data structure of the 3D point cloud map is constructed by using step 1 to step 5; and if point cloud data obtained in real time in the unmanned driving is the search point in step 6 and step 7, the K pieces of nearest neighboring point cloud data of the point cloud data obtained in real time are found in the 3D point cloud map by using step 6 and step 7, to realize point cloud map matching.

Compared with the prior art, the present invention has the following innovations.

(1) The present invention uses a novel data structure (DSVS) for fast K-nearest neighbor search, such that each voxel or sub-voxel includes a proper quantity of points to reduce redundant search. Different from the GBDS, each subspace of the new data structure includes a more balanced quantity of points. Compared with KD-tree, the present invention only needs to segment point cloud space for a limited quantity of times. This greatly reduces time for establishing a data structure.

(2) The present invention uses a novel K-nearest neighbor search algorithm based on a DSVS and an FPGA. The present invention has the following advantages: 1. nearest neighbors are searched only in a neighboring expected area near a search point, thereby reducing search of redundant points; and 2. an optimized data transmission and access policy is used, which makes the algorithm more fit the characteristic of the FPGA.

BRIEF DESCRIPTION OF THE DRAWINGS

FIGURE is a flowchart of the present invention.

DETAILED DESCRIPTION OF THE EMBODIMENTS

The present invention is described in detail below with reference to specific embodiments. It should be understood that these embodiments are only used to describe the present invention and are not used to limit the scope of the present invention. In addition, it should be understood that various changes and modifications may be made on the present invention by those skilled in the art after reading the content of the present invention, and these equivalent forms also fall within the scope defined by the appended claims of this disclosure.

The present invention provides an efficient K-nearest neighbor search algorithm implemented on an FPGA by using a high-level synthesis tool. The present invention includes a novel data structure (double segmentation voxel structure (DSVS)) and an efficient search method based on the data structure. The DSVS segments entire point cloud space into a series of voxels and sub-voxels including an even quantity of points. A specific process is as follows.

Step 1: Calculate an axis-aligned bounding box (AABB) of a disordered point cloud data set D.

Step 2: Segment the AABB obtained in the previous step is segmented and into S 3D spaces based on an expected radius R set by a user and a memory constraint, where each 3D space is defined as a voxel, an edge length of each voxel is $R_{re}$, and $R_{re} \geq R$.

The memory constraint is as follows: if a quantity of voxels obtained based on the expected radius R is greater than a maximum quantity M allowed by a memory, the edge length $R_{re}$ of each voxel is greater than the expected radius R when the AABB is segmented, such that the quantity of voxels obtained though segmentation is not greater than M; if the quantity of voxels obtained based on the expected radius R is not greater than the maximum quantity M allowed by the memory, the edge length $R_{re}$ of each voxel is equal to the expected radius R when the AABB is segmented.

During practical use of K-nearest neighbor search, there is a distance requirement on data of neighbors. If a distance is exceeded, a found result is no longer reliable in this case. Therefore, the present invention proposes the expected radius R. The expected radius R is an expected search radius. That is, when the K-nearest neighbor search is performed, all nearest neighbors within the expected spherical space formed with a search point as a center of a sphere and the expected radius R as the search radius need be found.

Step 3: Traverse each piece of point cloud data in the disordered point cloud data set D in step 1, and calculate a specific voxel to which each piece of point cloud data belongs and a quantity of pieces of point cloud data included in each voxel.

Step 4: Further segment the corresponding voxel into a plurality of sub-voxels based on the quantity of pieces of point cloud data included in each voxel; and assume that an $i^{th}$ voxel includes $N_i$ pieces of point cloud data, where i=1, 2, . . . , I; segment the $i^{th}$ voxel into J sub-voxels if $N_i > T$, and ensure that $\overline{N}_j < A$, where T is a preset threshold, $$\overline{N}_J = \frac{\sum_{j=1}^{J} N_j}{J},$$

$N_j$ represents a quantity of pieces of point cloud data included in a $j^{th}$ sub-voxel, and A is a parameter adjusted by the user or dynamically adjusted by a scene.

Step 5: Segment the disordered point cloud data set D into a series of voxels and sub-voxels by using step 1 to step 4, where a DSVS data structure is constructed by the series of voxels and sub-voxels, and the DSVS data structure includes a series of configuration information, such as a total quantity of voxels, voxels segmented into sub-voxels, a quantity of corresponding sub-voxels, pieces of point cloud data included in each voxel and sub-voxel, and the edge length $R_{re}$ of each voxel.

Step 6: Obtain a search set constructed by search points. To optimize data transmission and data access on the FPGA, the disordered point cloud data set and the search set are sorted based on the DSVS data structure and the configuration information thereof, such that physical addresses of search points located in an identical voxel or sub-voxel in the search set are neighboring and continuous, thereby continuously transmitting the search points into the FPGA, and simultaneously reading a plurality of pieces of data in an identical voxel or sub-voxel on the FPGA.

Step 7: Search for search points in the search set based on the DSVS data structure by using the K-nearest neighbor search algorithm to obtain K pieces of nearest neighboring point cloud data of the current search point within the expected radius, where step 7 includes the following steps.

Step 701: Calculate a voxel to which the search point belongs, and define the voxel as a current voxel.

Step 702: Calculate distances between the search point and neighboring voxels and/or sub-voxels of the current voxel, where a search domain Q is constructed by the neighboring voxels and/or sub-voxels within a distance range and the current voxel.

The search domain Q may be determined in this way because only neighbors within a range are meaningful for nearest neighbor search in light detection and ranging point cloud data in unmanned driving. If a found neighbor is too far away, the search point may be considered a divorce point. The search domain Q consists of the voxels (without double segmentation) and the sub-voxels within the range, and includes the expected spherical space in step 2 above.

Step 703: Traverse pieces of point cloud data in the search domain Q, and calculate K pieces of nearest neighboring point cloud data of the search point in the pieces of point cloud data. In a search process, search efficiency is greatly improved in forms of an intra-function pipeline and an inter-function data flow by using the FPGA. An experimental result shows that energy efficiency of the method provided in the present invention is 2.1 times and 6.2 times higher than a latest technology on the FPGA and a graphics processing unit (GPU) respectively on average.

The foregoing K-nearest neighbor search algorithm may be applied to point cloud map matching in the unmanned driving. A 3D point cloud map may consist of data from a light detection and ranging or binocular cameras. If the 3D point cloud map is the disordered point cloud data set in step 1, the DSVS data structure of the 3D point cloud map is constructed by using step 1 to step 5. If point cloud data obtained in real-time in the unmanned driving is the search point in step 6 and step 7, the K pieces of nearest neighboring point cloud data of the point cloud data obtained in real time are found in the 3D point cloud map by using step 6 and step 7, to realize point cloud map matching. It should be noted that during driving of an unmanned driving vehicle, the point cloud map may also be updated in real time, and an updated point cloud map needs to re-use step 1 to step 5 to construct a corresponding DSVS data structure.

For a complex outdoor environment, the present invention can well complete a task of searching for K nearest neighboring points in a huge data set. Acceleration of the FPGA makes an entire algorithm to have better real-time performance and consume less energy.

What is claimed is:

1. An optimal method providing 3D geometric information on an autonomous vehicle's surroundings implemented by a computer having a processor and a memory, wherein a computer instruction is stored on the memory, wherein the computer instruction, when being executed, implements the following steps comprising:

step 1: calculating an axis-aligned bounding box (AABB) of a disordered point cloud data set;

step 2: segmenting the AABB obtained in step 1 into S 3D spaces based on an expected radius R set by a user, wherein each 3D space is defined as a voxel, an edge length of each voxel is $R_{re}$, and $R_{re} > R$;

step 3: traversing each piece of point cloud data in the disordered point cloud data set in step 1, and calculating a specific voxel to which each piece of point cloud data belongs and a quantity of pieces of point cloud data comprised in each voxel;

step 4: further segmenting a corresponding voxel into a plurality of sub-voxels based on the quantity of pieces of point cloud data comprised in each voxel; assuming that an $i^{th}$ voxel comprises $N_i$ pieces of point cloud data, wherein i=1, 2, . . . , I; segmenting the $i^{th}$ voxel into J sub-voxels when $N_i > T$, and ensuring that $\overline{N}_J < A$, wherein T is a preset threshold, $$\overline{N}_J = \frac{\sum_{j=1}^{J} N_j}{J},$$

$N_j$ represents a quantity of pieces of point cloud data comprised in a $j^{th}$ sub-voxel, and A is a parameter adjusted by the user or dynamically adjusted by a scene;

step 5: segmenting the disordered point cloud data set into a series of voxels and sub-voxels by using step 1 to step 4, wherein a double segmentation voxel structure (DSVS) data structure is constructed by the series of voxels and sub-voxels;

step 6: obtaining a search set constructed by search points, and sorting the disordered point cloud data set and the search set based on the DSVS data structure and the configuration information, wherein physical addresses of search points located in an identical voxel or sub-voxel in the search set are neighboring and continuous, the search points are continuously transmitted into a field programmable gate array (FPGA), and a plurality of pieces of data in an identical voxel or sub-voxel on the FPGA are read simultaneously to optimize data transmission and data access on the FPGA; and step 7: searching for a search point based on the DSVS data structure by using the K-nearest neighbor search algorithm to obtain K pieces of nearest neighboring point cloud data of the current search point within the expected radius R, wherein step 7 comprises the following steps:

step 701: calculating a voxel to which the search point belongs, and defining the voxel as a current voxel;

step 702: calculating distances between the search point and neighboring voxels and/or sub-voxels of the current voxel, wherein a search domain is constructed by the neighboring voxels and/or sub-voxels within a distance range and the current voxel; and step 703: traversing pieces of point cloud data in the search domain, and calculating K pieces of nearest neighboring point cloud data of the search point in the pieces of point cloud data to improve search efficiency or energy consumption efficiency of the computer while providing real-time 3D geometric information on an autonomous vehicle's surroundings.

2. The method according to claim 1, wherein in step 2, a memory constraint is further considered when the 3D space is segmented, and the memory constraint is as follows:

when a quantity of voxels obtained based on the expected radius R is greater than a maximum quantity M allowed by a memory, the edge length $R_{re}$ of each voxel is greater than the expected radius R when the AABB is segmented, wherein the quantity of voxels obtained though segmentation is not greater than M;

when the quantity of voxels obtained based on the expected radius R is not greater than the maximum quantity M allowed by the memory, the edge length $R_{re}$ of each voxel is equal to the expected radius R when the AABB is segmented.

3. The method according to claim 1, wherein in step 5, the DSVS data structure further comprises configuration information, and the configuration information comprises a total quantity of voxels, voxels segmented into sub-voxels, a quantity of corresponding sub-voxels, pieces of point cloud data comprised in each voxel and sub-voxel, and the edge length $R_{re}$ of each voxel.

4. The method according to claim 1, wherein in step 703, in a traversal search process, the K pieces of nearest neighboring point cloud data are searched in parallel in forms of an intra-function pipeline and an inter-function data flow by using the FPGA.

5. The method according to claim 1, wherein a point cloud map matching process is performed by executing either steps 1 to 5 or steps 6 and 7;

wherein when a 3D point cloud map already constructed of the autonomous vehicle's surroundings is the disordered point cloud data set in step 1, the DSVS data structure of the 3D point cloud map is constructed by using step 1 to step 5; and wherein when point cloud data obtained in real time of the autonomous vehicle's surroundings is the search point in step 6 and step 7, the K pieces of nearest neighboring point cloud data of the point cloud data obtained in real time are found in the 3D point cloud map by using step 6 and step 7, to realize point cloud map matching.

* * * * *